United States Patent
Singh et al.

(10) Patent No.: US 10,585,802 B1
(45) Date of Patent: Mar. 10, 2020

(54) METHOD AND SYSTEM FOR CACHING DIRECTORIES IN A STORAGE SYSTEM

(71) Applicant: EMC IP Holding Company LLC, Hopkinton, MA (US)

(72) Inventors: Pranay Singh, San Ramon, CA (US); Murthy Mamidi, San Jose, CA (US); Pengju Shang, Milpitas, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 15/649,570

(22) Filed: Jul. 13, 2017

(51) Int. Cl.
*G06F 12/0871* (2016.01)
*G06F 12/02* (2006.01)
*G06F 16/13* (2019.01)
*G06F 16/2455* (2019.01)

(52) U.S. Cl.
CPC ...... *G06F 12/0871* (2013.01); *G06F 12/0246* (2013.01); *G06F 16/13* (2019.01); *G06F 16/24552* (2019.01); *G06F 2212/222* (2013.01)

(58) Field of Classification Search
CPC ............. G06F 12/0871; G06F 12/0246; G06F 16/24552; G06F 16/13; G06F 2212/222
See application file for complete search history.

(56) References Cited

U.S. PATENT DOCUMENTS

| | | | | |
|---|---|---|---|---|
| 6,539,382 | B1* | 3/2003 | Byrne | G06F 12/0862 711/118 |
| 6,625,591 | B1* | 9/2003 | Vahalia | G06F 16/9014 |
| 9,098,424 | B2* | 8/2015 | Hyde, II | G06F 12/0891 |
| 9,317,511 | B2* | 4/2016 | Kanfi | G06F 16/122 |
| 9,613,064 | B1* | 4/2017 | Chou | G06F 16/182 |
| 9,852,076 | B1* | 12/2017 | Garg | G06F 16/172 |
| 2006/0294115 | A1* | 12/2006 | Armangau | G06F 16/13 |
| 2006/0294164 | A1* | 12/2006 | Armangau | G06F 16/137 |
| 2008/0027946 | A1* | 1/2008 | Fitzgerald | G06F 16/10 |
| 2009/0119530 | A1* | 5/2009 | Fisk | G06F 1/3221 713/324 |
| 2013/0339407 | A1* | 12/2013 | Sharpe | G06F 3/0611 707/827 |
| 2016/0026652 | A1* | 1/2016 | Zheng | G06F 16/1752 707/692 |
| 2016/0352750 | A1* | 12/2016 | Dotan | H04L 63/102 |

* cited by examiner

*Primary Examiner* — Ramon A. Mercado
(74) *Attorney, Agent, or Firm* — Womble Bond Dickinson (US) LLP

(57) ABSTRACT

According to some embodiment, a storage system selects one or more directories within a file system as candidates for caching based on directory statistics associated with the directories, where each of the directories includes one or more file objects stored in the storage system. For each of the selected directories, the system determines whether the directory is to be cached based on a directory cache policy. The system caches the directory in a cache memory device in response to determining that the directory is to be cached.

20 Claims, 6 Drawing Sheets

METHOD AND SYSTEM FOR CACHING DIRECTORIES IN A STORAGE SYSTEM

FIELD OF THE INVENTION

Embodiments of the present invention relate generally to data storage systems. More particularly, embodiments of the invention relate to method and system for caching directories in a storage system.

BACKGROUND

In a deduplicated file system, which is often used on disk-based storage systems, i.e., hard disk drives (HDDs), namespace operations are generally expensive as accessing (e.g., reading) a directory may churn a system cache by way of write-erase cycles. A directory generally refers to a location for storing one or more files in a hierarchical file system.

For example, in a workload with a large directory (e.g., a directory having a significant amount of files, such as 100 or 1,000 files) or frequently accessed directory, accessing such directory may severely impact system performance as the number of write-erase cycles (churn) may increase for the system cache, thereby reducing the useful life span of the system cache.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, to improve access performance (e.g., read) of a directory in a deduplicated file system, the directory may be cached in a cache device for subsequent access. In one aspect, a storage system selects one or more directories within a file system as candidates for caching based on directory statistics associated with the directories. Each of the directories includes one or more file objects stored in the storage system. For each of the selected directories, the system determines whether the directory is to be cached based on a directory cache policy. The system caches the directory in a cache memory device in response to determining that the directory is to be cached.

According to another aspect of the invention, prior to selecting one or more directories within the file system as candidates for caching, the system periodically scans the file system to obtain the directory statistics associated with the directories, where the directory statistics include a number of files in each of the directories or a frequency of access over a period of time for each of the directories.

According to another aspect of the invention, the cache memory device includes a cache list including one or more cache nodes. Each of the cache nodes stores a directory handle representing a directory cached in the cache memory device. The directory handle includes one or more chunks. Each of the chunks includes one or more directory records associated with one or more file objects within the directory cached in the cache memory device.

Figure 1:
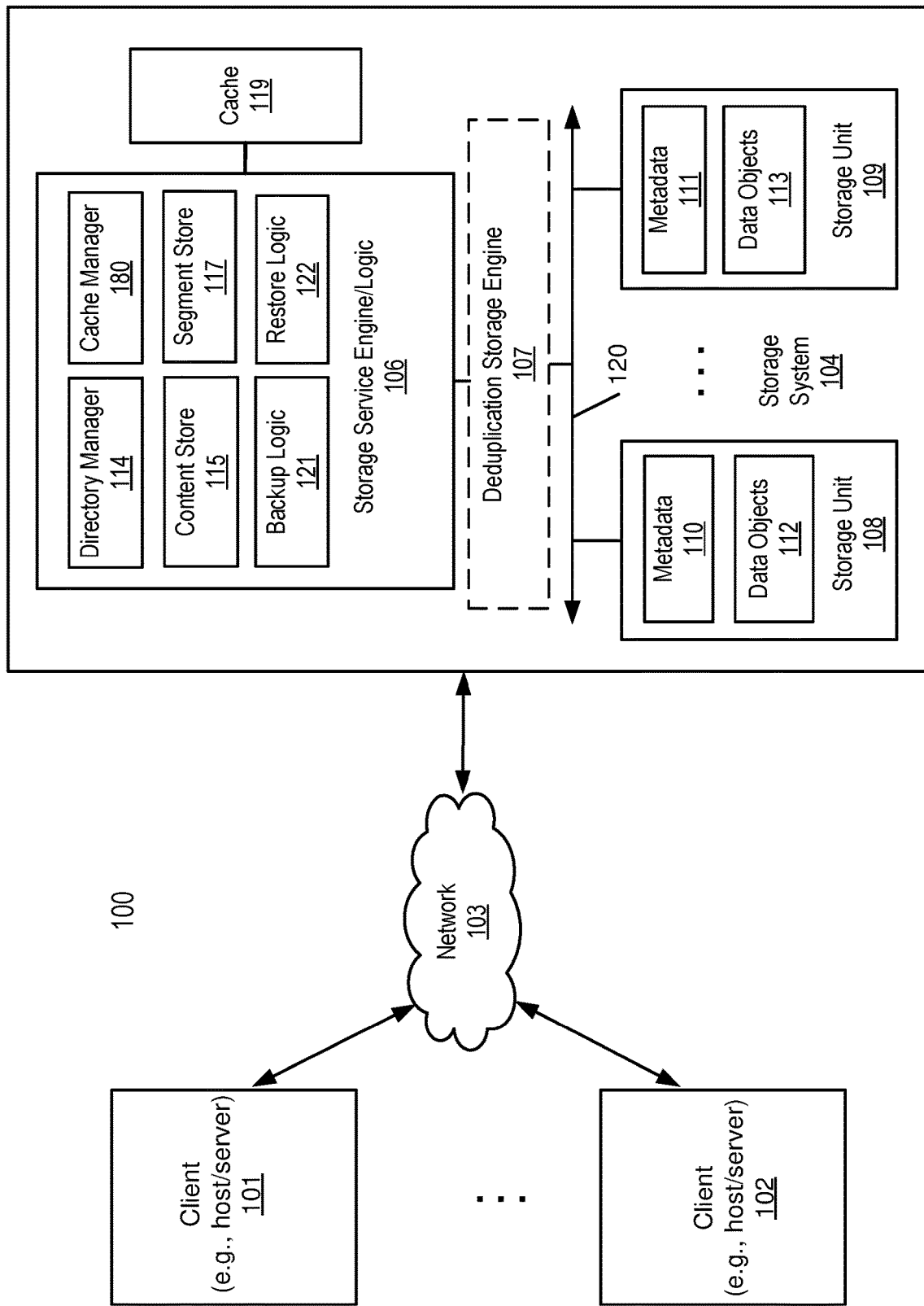
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, content store 115, segment store 117, optional backup logic 121, optional restore logic 122, and cache manager 180. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102). Directory manager 114 is configured to manage files stored in a file system of the storage system. Content store 115 may be configured to receive file segments requests from directory manager 114 and to retrieve the file segments from storage units 108-109 (via segment store 117) and/or cache 119. Segment store 117 may be configured to store and retrieve deduplicated segments to and from storage units 108-109. In another embodiment, segment store 117 includes deduplication storage engine 107 (not shown) and deduplicates file segments prior to storing the segments in storage units 108-109. Cache manager 180 is configured to manage access of a cache memory device, such as cache 119, with respect to storage units 108-109.

Cache 119 may be part of system memory of storage system 104. Cache 119 may be dynamic RAM (DRAM) or non-volatile RAM (NVRAM) or a combination thereof in one embodiment. In another embodiment, cache 119 may be a persistent cache memory device (such as a solid state device (SSD) or flash memory) to accelerate performance. Cache 119 may contain a cache index, which interacts with content store 115 (to index file segments stored in cache 119 by storing portions or all of fingerprints of these segments in the cache index) to accelerate reading from and writing data to cache 119.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication storage engine or deduplication logic 107 is configured to segment the data file into multiple segments (also referred to as chunks) according to a variety of segmentation policies or rules. Deduplication storage engine 107 may be implemented as part of content store 115 and/or segment store 117. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
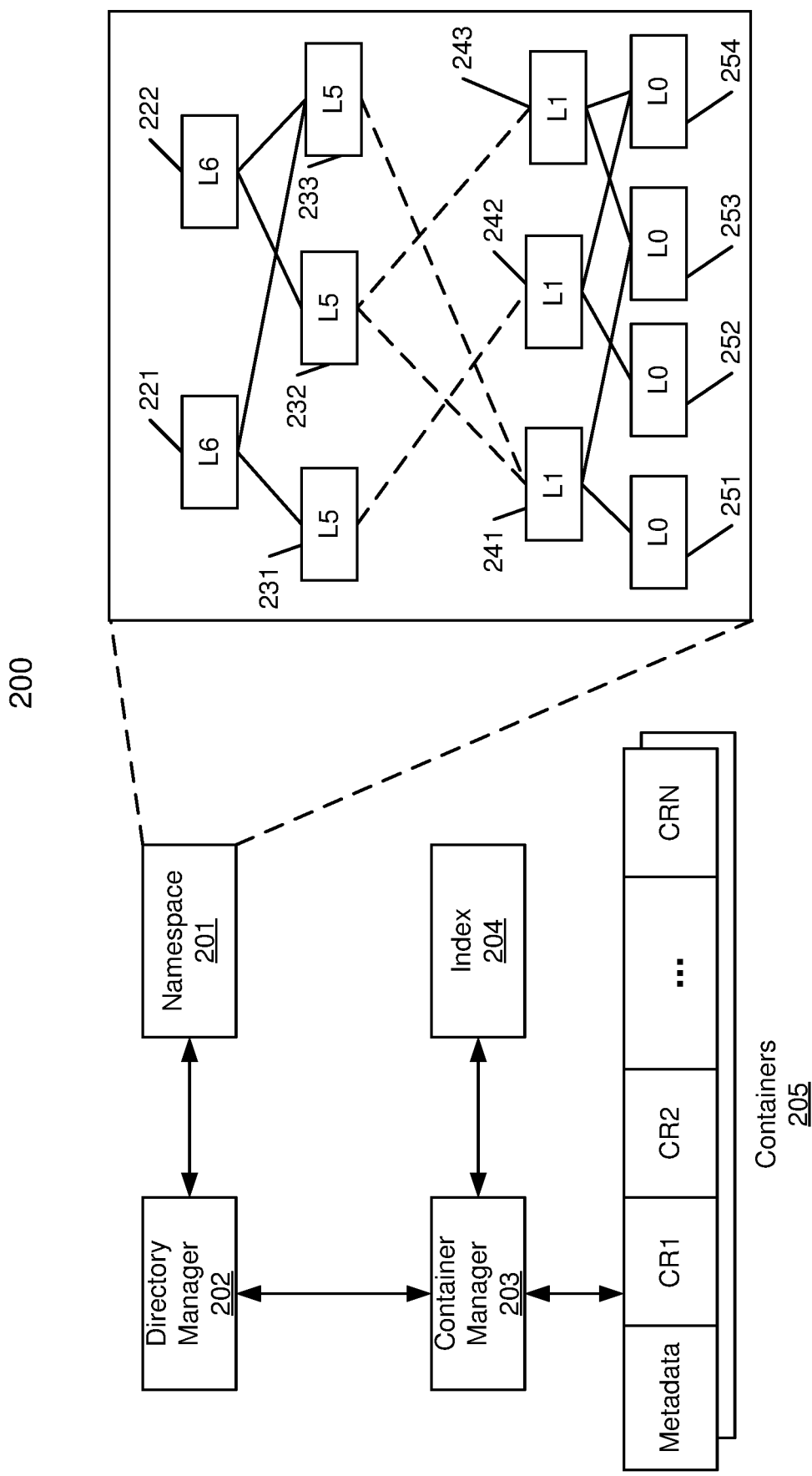
FIG. 2 is a block diagram illustrating an example of a Merkle tree file structure according to one embodiment of the invention.

FIG. 2 is a block diagram illustrating a storage system according to one embodiment of the invention. System 200 may be implemented as part of storage system 104 of FIG. 1. Referring to FIG. 2, system 200 traverses namespace 201 via directory manager 202, where directory manager 202 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. Thus, L1 to L6 are segments only contain metadata of their respective child segments(s), referred to herein as Lp segments.

In one embodiment, when system 200 traverses namespace 201 via directory manager 202, it obtains the fingerprints of the root level segments, in this example, L6 segments, as part of content handles from namespace 201. Based on the fingerprints of the current level segments, container manager 203 can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 2, in one embodiment, there are two components responsible to manage the files in the system. The first one is directory manager 202, which is a hierarchical mapping from the path to the inode representing a file. The second one is a content store, such as content store 115, which manages the content of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references. Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data.

Figure 3:
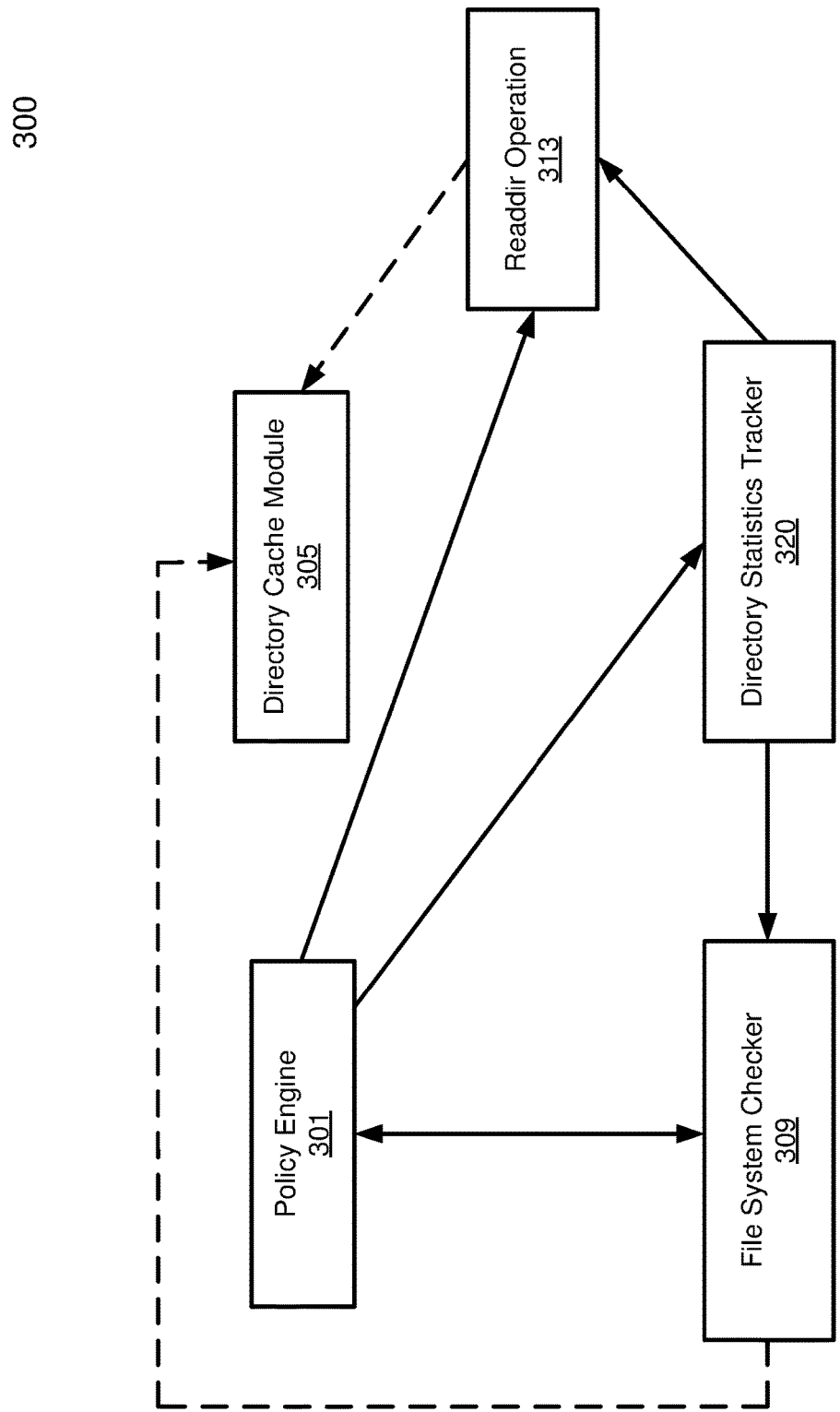
FIG. 3 is a block diagram illustrating example directory cache architecture according to one embodiment of the invention.

FIG. 3 is a block diagram illustrating example directory cache architecture according to one embodiment of the invention. Directory cache architecture 300 may be implemented as a part of storage system 104 of FIG. 1 (e.g., within content store 115, segment store 117, cache manager 180, or a combination thereof). Referring to FIG. 3, directory cache architecture 300 may include policy engine 301, directory cache module 305, file system checker 309, read directory (readdir) operation 313, and directory statistics tracker 320.

Policy engine 301 may store a cache policy that is used to cache one or more directories within a file system of a storage system (e.g., storage system 104 of FIG. 1). The cache policy may be defined by rules (e.g., default rules or rules created or set by a system administrator) to determine whether a directory may be cached. For example, the rules may allow a large directory (e.g., a directory having a significant amount of files, such as at least 100 or 1,000 files), a directory that is frequently accessed, or a directory associated with a namespace (among many namespaces being used in a storage system) with a high or low quality of service (QoS) to be cached.

Directory statistics tracker 320 may maintain a data structure that tracks and stores directory statistics for a particular namespace (e.g., a Merkle tree or Mtree) based on the cache policy stored by policy engine 301. As an example, if the cache policy is based on rules that allow a large directory to be cached, directory statistics tracker 320 may track and store a number of files (i.e., file count) within a particular directory in a namespace as directory statistics. On the other hand, if the cache policy is based on rules that allow a frequently accessed directory to be cached, directory statistics tracker 320 may track and store a frequency of access (read/write) over a period of time for a particular directory in the namespace as directory statistics. In some embodiments, directory statistics tracker 320 may maintain directory statistics (e.g., file count and/or frequency of access) for every directory in the namespace regardless of the cache policy. In some embodiments, the namespace may be an NFS export or a share/independent namespace. In some embodiments, the data structure may be stored in memory, such as cache 119 of FIG. 1.

File system checker 309, which may be a utility (e.g., a daemon or microservice) in some embodiments, periodically scans the file system to select one or more directories as candidates for caching. That is, file system checker 309 may traverse the directory statistics maintained by directory statistics tracker 320 to determine potential directories that may be cached. For example, if the cache policy (from policy engine 301) is based on caching large directories, file system checker 309 may select directories that include at least a specific number of files (e.g., at least 100 or 1,000 files) as candidates for caching. Conversely, if the cache policy is based on frequently accessed directories, file system checker may select directories with at least a certain frequency of access as candidates for caching.

The selected candidates for caching are communicated to policy engine 301 to determine which candidates to cache. For example, depending on the cache policy, and memory space available in a cache device (e.g., cache 119 of FIG. 1) in some embodiments, policy engine 301 may further filter and select specific directories from the candidates to cache. Subsequently, policy engine 301, via file system checker 309, may communicate the directories to be cached to directory cache module 305.

Directory cache module 305 is configured to store the directories to be cached in a cache device (e.g., cache 119 of FIG. 1). For example, directory cache module 305 may write directory entries associated with a directory to be cached to the cache device, with each of the directory entries including fingerprints (e.g., metadata) of files or file objects in the directory. In some embodiments, directory cache module 305 may cache a directory in its entirety or not cache the directory at all. For instance, depending on the memory space available in the cache device, directory cache module 305 may not cache a directory if all of the entries of the directory cannot be stored in the cache device. Otherwise, in some embodiments if memory space is available, directory cache module 305 may cache a directory in its entirety by writing all of the entries of the directory to the cache device.

In some embodiments, instead of or in addition to having the file system checker 309 scan the file system and select the candidates to cache (which may be referred to as "passive caching"), a directory may be actively cached. For example, when a user of a client (e.g., clients 101-102) selects or clicks on a particular directory, such action may trigger read directory operation 313. Subsequently, read directory operation 313 may check the directory statistics maintained by directory statistics tracker 320 and the cache policy from policy engine 301 to determine whether the directory is required to be cached. For example, in one embodiment if the cache policy is based on caching large directories, read directory operation 313 may check the directory statistics associated with the directory to determine whether a number of files/file objects in the directory meets or exceeds a specific threshold (e.g., 100 or 1,000 files) to be considered as a large directory. If so, read directory operation 313 communicates the directory to directory cache module 305 for caching. On the other hand, in another embodiment if the cache policy is based on caching frequently accessed directories, read directory operation 313 may check the directory statistics associated with the directory to determine whether a frequency of access over a period of time associated with the directory meets or exceeds a certain threshold. If so, again, read directory operation 313 communicates the directory to directory cache module 305 for caching. Accordingly, as the directories are cached, subsequent access (e.g., reading) of such directories would limit churn on the system cache of a storage system, thereby improving system performance of the storage system.

Figure 4:
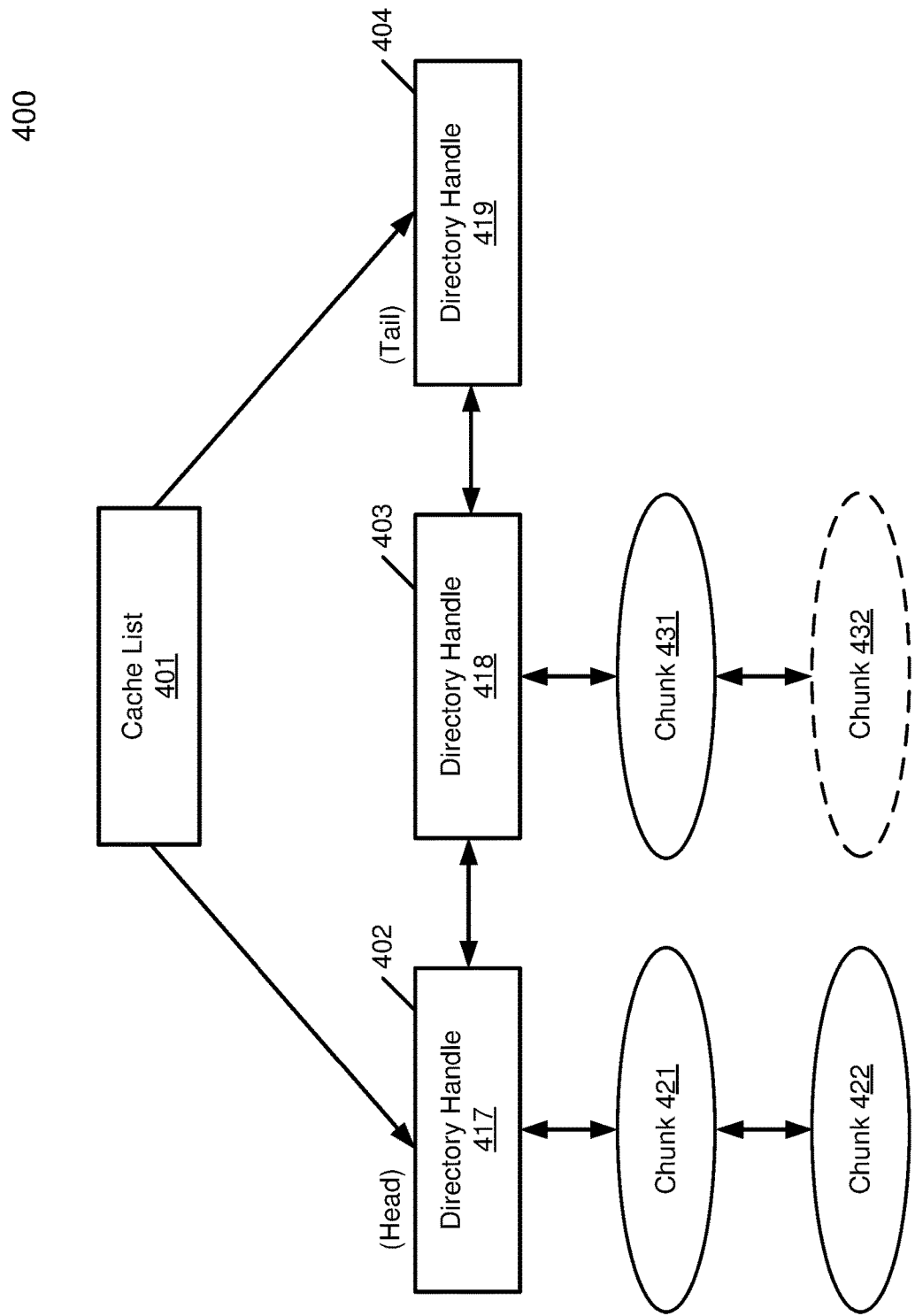
FIG. 4 is a block diagram illustrating example of directory cache layout according to one embodiment of the invention.

FIG. 4 is a block diagram illustrating example of directory cache layout according to one embodiment of the invention. In some embodiments, directory cache layout 400 may be implemented within a cache device, for example cache 119 of FIG. 1, and in accordance with a cache replacement algorithm/policy, for example, least recently used (LRU) or most recently used (MRU).

In FIG. 4, directory cache layout 400 includes a cache list 401. Cache list 401 (e.g., LRU list) may include one or more nodes 402-404, with each node pointing to a next node. Each of the nodes may store a directory handle (e.g., directory handles 417-419) that represents the cached directory. The directory handle may include one or more chunks (e.g., chunks 421-422 and 431-432), each having one or more directory entries of the cached directory. In some embodiments, each of the directory entries in a chunk may include a key and one or more directory records, where the key is used to identify the directory record(s). In some embodiments, the directory records may include fingerprints (e.g., metadata) of files/file objects in the cached directory. In some embodiments, the size of a directory record is variable depending on the size of a filename.

Still referring to FIG. 4, cache list 401 is configured to keep track of the frequency of access for each directory handle. For example, cache list 401 may be periodically sorted such that the most recently accessed directory handle (e.g., directory handle 417) is stored in a head node (e.g., node 402), and the least recently accessed directory handle (e.g., directory handle 419) is stored in a tail node (e.g., node 404). In this scenario, the directory handle in the tail node is victimized (e.g., evicted) if additional memory cannot be allocated. In some embodiments, a number of directories cached for a namespace can be tracked using cache list 401. For instance, in a deduplicated file system, there are a fixed number of directories that can be cached. This number of directories is limited by the number of nodes in cache list 401. Since the directory handle in each node has details of the namespace, therefore, the number of directories cached for a given namespace can be tracked via cache list 401.

In some embodiments, memory space required for cache list 401 is based on the number of chunks (e.g., chunks 421-422 and 431-432). For example, if the chunk size of a cached directory is 1 KB, then for 400 chunks the memory space consumed is 400 KB in addition to the size and number of data structure to record each of the directory handles.

In some embodiments, directory records may be stored in a sorted manner within a directory entry (i.e., a chunk). In one embodiment, as files are created in and/or added to a directory, directory records may be added to a chunk. As memory space in the chunk is filled up or full, additional chunks (e.g., chunk 432) may need to be allocated, via a chunk allocator (not shown), in order to store new directory records. On the other hand, when files are deleted from a directory, directory records may be removed, which may result in one chunk merging with a neighboring chunk to save memory space. For example, in FIG. 4, if one or more directory records in chunk 421 are removed, chunk 421 may merge with chunk 422 as a part of the removal. In this case, keys and directory records from chunk 421 and chunk 422 may be merged or moved into the newly merged chunk.

As previously described, directory records within a chunk are stored in a sorted manner. As such, in some embodiments, to search for a directory record across various chunks of a directory handle, a key from the last chunk of a particular directory handle may be compared against a desired key, which identifies the desired directory record. If the desired key is greater than the key from the last chunk, then a subsequent comparison may be performed where the desired key may be compared against a key from a successive chunk. This method may be ongoing until a key that matches the desired key is found. Once the matching key is found, it may be used to identify the desired directory record within a chunk. In some embodiments, the foregoing operations described to search for a directory record are similar to the traversal operations of a skip list.

Figure 5:
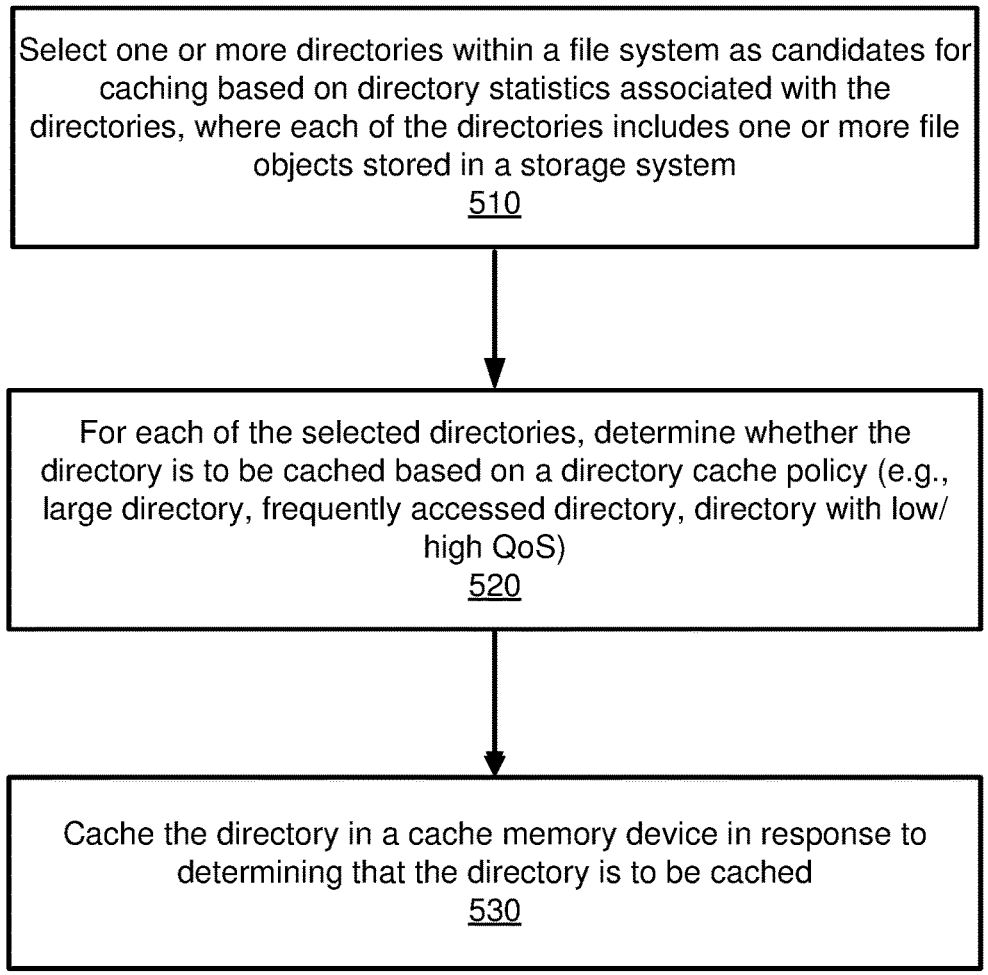
FIG. 5 is a flow diagram illustrating a method to access a directory in a file system according to one embodiment of the invention.

FIG. 5 is a flow diagram illustrating a method to access a directory in a file system according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by directory cache architecture 300 of FIG. 3.

Referring to FIG. 5, at block 510, processing logic selects one or more directories within a file system as candidates for caching based on directory statistics associated with the directories, where each of the directories includes one or more file objects stored in a storage system. At block 520, for each of the selected directories, the processing logic determines whether the directory is to be cached based on a directory cache policy (e.g., large directory, frequently accessed directory, directory with low/high QoS). At block 530, the processing logic caches the directory in a cache memory device in response to determining that the directory is to be cached.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
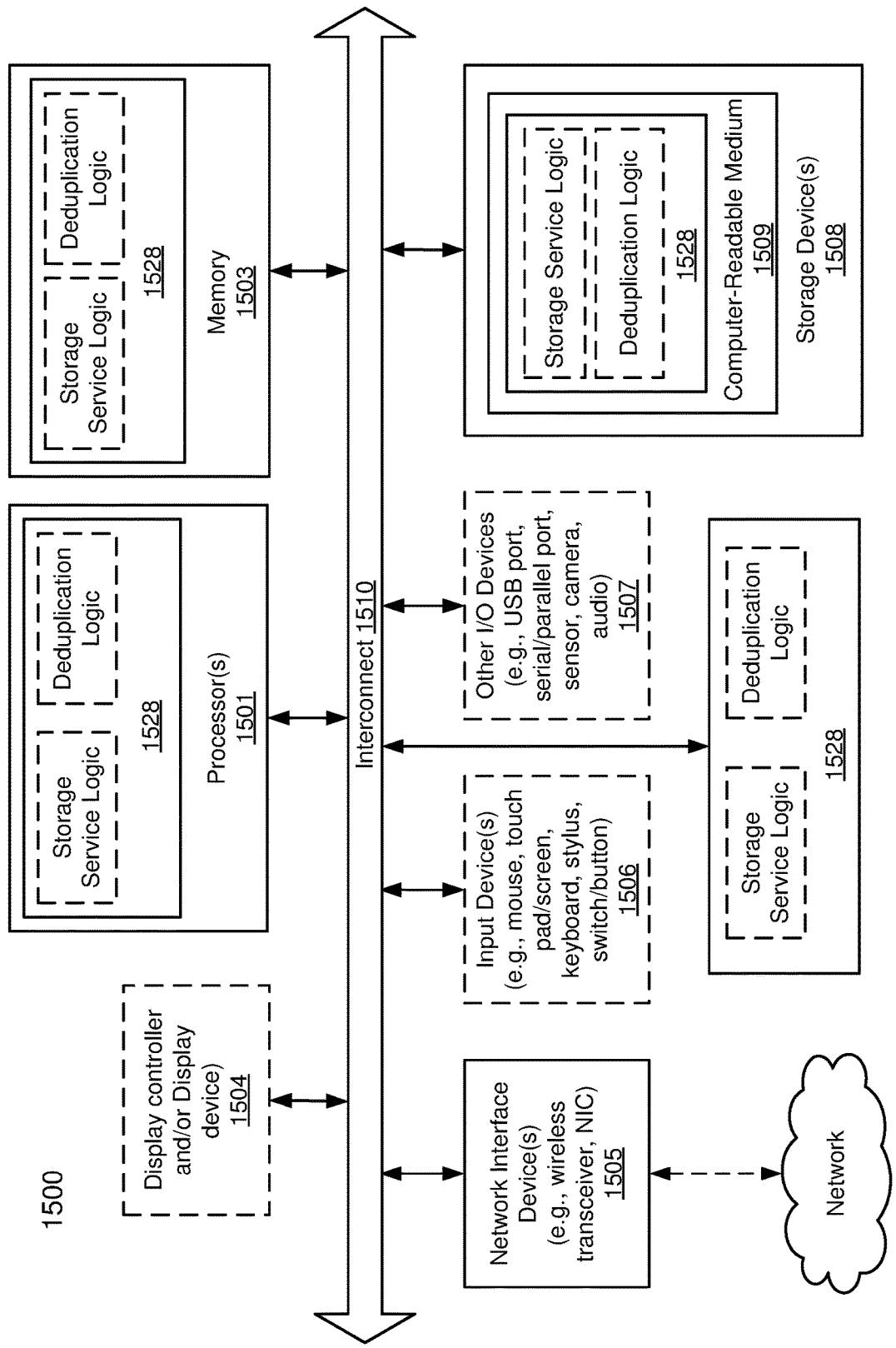
FIG. 6 is a block diagram illustrating an example of a data processing system which may be used with one embodiment of the invention.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for accessing a directory in a file system, the method comprising:
    selecting one or more directories within a deduplicated file system as candidates for caching based on directory statistics associated with the directories, wherein each of the directories includes one or more file objects stored in a storage system;
    for each of the selected directories,
        determining whether the directory is to be cached based on a directory cache policy; and caching the directory, comprising caching all the one or more file objects of the directory, in a cache memory device in response to determining that the directory is to be cached, wherein the cache memory device comprises a cache list including one or more ordered cache nodes with each cache node pointing to a next cache node, wherein each of the cache nodes stores a single directory handle representing a single directory cached in the cache memory device, and wherein the cache nodes are sorted based on a last access time such that a cache node storing a most recently accessed directory handle is a head node in the cache list and a cache node storing a least recently accessed directory handle is a tail node in the cache list.

2. The method of claim 1, wherein caching the directory in the cache memory device comprises writing fingerprints of every file objects in the directory into the cache memory device.

3. The method of claim 1, wherein the directory cache policy is defined by rules used to determine whether the directory is a large directory, a directory that is frequently accessed, or a directory having a high quality of service (QoS).

4. The method of claim 1, wherein prior to selecting one or more directories within the file system as candidates for caching:
periodically scanning the file system to obtain the directory statistics associated with the directories, wherein the directory statistics include a number of files in each of the directories or a frequency of access over a period of time for each of the directories.

5. The method of claim 1, wherein each directory handle includes one or more chunks, each of the chunks including one or more directory records associated with one or more file objects within the corresponding directory cached in the cache memory device.

6. The method of claim 5, wherein caching the directory in the cache memory device comprises:
merging a first chunk of the directory handle with a second chunk of the directory handle to form a merged chunk when one or more directory records of the first chunk or one or more directory records of the second chunk are respectively removed from the first or second chunk.

7. The method of claim 5, wherein caching the directory in a cache memory device further comprises:
allocating a new chunk within the directory handle when additional directory records are added to a full chunk.

8. The method of claim 5, wherein caching the directory in the cache memory device comprises:
sorting the cache nodes based on a frequency of access such that the directory handle of a most frequently accessed directory is stored in a head node and the directory handle of a least frequently accessed directory is stored in a tail node.

9. A non-transitory machine-readable medium having instructions stored therein, which when executed by a processor, cause the processor to perform operations for, the operations comprising:
selecting one or more directories within a deduplicated file system as candidates for caching based on directory statistics associated with the directories, wherein each of the directories includes one or more file objects stored in a storage system;
for each of the selected directories,
determining whether the directory is to be cached based on a directory cache policy; and
caching the directory, comprising caching all the one or more file objects of the directory, in a cache memory device in response to determining that the directory is to be cached, wherein the cache memory device comprises a cache list including one or more ordered cache nodes with each cache node pointing to a next cache node, wherein each of the cache nodes stores a single directory handle representing a single directory cached in the cache memory device, and wherein the cache nodes are sorted based on the last access time such that a cache node storing a most recently accessed directory handle is a head node in the cache list and a cache node storing a least recently accessed directory handle is a tail node in the cache list.

10. The non-transitory machine-readable medium of claim 9, wherein caching the directory in the cache memory device comprises writing fingerprints of every file objects in the directory into the cache memory device.

11. The non-transitory machine-readable medium of claim 9, wherein the directory cache policy is defined by rules used to determine whether the directory is a large directory, a directory that is frequently accessed, or a directory having a high quality of service (QoS).

12. The non-transitory machine-readable medium of claim 9, wherein prior to selecting one or more directories within the file system as candidates for caching:
periodically scanning the file system to obtain the directory statistics associated with the directories, wherein the directory statistics include a number of files in each of the directories or a frequency of access over a period of time for each of the directories.

13. The non-transitory machine-readable medium of claim 9, wherein each directory handle includes one or more chunks, each of the chunks including one or more directory records associated with one or more file objects within the corresponding directory cached in the cache memory device.

14. The non-transitory machine-readable medium of claim 13, wherein caching the directory in the cache memory device comprises:
merging a first chunk of the directory handle with a second chunk of the directory handle to form a merged chunk when one or more directory records of the first chunk or one or more directory records of the second chunk are respectively removed from the first or second chunk.

15. The non-transitory machine-readable medium of claim 13, wherein caching the directory in a cache memory device further comprises:
allocating a new chunk within the directory handle when additional directory records are added to a full chunk.

16. The non-transitory machine-readable medium of claim 13, wherein caching the directory in the cache memory device comprises:
sorting the cache nodes based on a frequency of access such that the directory handle of a most frequently accessed directory is stored in a head node and the directory handle of a least frequently accessed directory is stored in a tail node.

17. A data processing system, comprising:
a processor; and
a memory coupled to the processor to store instructions, which when executed by the processor, cause the processor to perform operations, the operations comprising:
selecting one or more directories within a deduplicated file system as candidates for caching based on directory statistics associated with the directories, wherein each of the directories includes one or more file objects stored in a storage system;

for each of the selected directories, determining whether the directory is to be cached based on a directory cache policy; and caching the directory, comprising caching all the one or more file objects of the directory, in a cache memory device in response to determining that the directory is to be cached, wherein the cache memory device comprises a cache list including one or more ordered cache nodes with each cache node pointing to a next cache node, wherein each of the cache nodes stores a single directory handle representing a single directory cached in the cache memory device, and wherein the cache nodes are sorted based on a last access time such that a cache node storing a most recently accessed directory handle is a head node in the cache list and a cache node storing a least recently accessed directory handle is a tail node in the cache list.

18. The data processing system of claim 17, wherein caching the directory in the cache memory device comprises writing fingerprints of every file objects in the directory into the cache memory device.

19. The data processing system of claim 17, wherein the directory cache policy is defined by rules used to determine whether the directory is a large directory, a directory that is frequently accessed, or a directory having a high quality of service (QoS).

20. The data processing system of claim 17, wherein prior to selecting one or more directories within the file system as candidates for caching:

periodically scanning the file system to obtain the directory statistics associated with the directories, wherein the directory statistics include a number of files in each of the directories or a frequency of access over a period of time for each of the directories.

* * * * *